(12) United States Patent
Roberge (10) Patent No.: US 7,854,112 B2
(45) Date of Patent: Dec. 21, 2010

(54) VECTORING TRANSITION DUCT FOR TURBINE ENGINE

(75) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 888 days.

(21) Appl. No.: 11/719,477

(22) PCT Filed: Dec. 1, 2004

(86) PCT No.: PCT/US2004/039997

§ 371 (c)(1),
(2), (4) Date: May 16, 2007

(87) PCT Pub. No.: WO2006/110123

PCT Pub. Date: Oct. 19, 2006

(65) Prior Publication Data

US 2009/0142184 A1    Jun. 4, 2009

(51) Int. Cl.
*F02K 3/02* (2006.01)

(52) U.S. Cl. ............................ 60/226.1; 60/771

(58) Field of Classification Search ............... 60/39.43, 60/226.1, 269, 262, 228, 230, 770, 771, 242; 415/155, 160, 161, 167, 77; 244/23 D; 239/265.19; 416/175, 203, 193 R
See application file for complete search history.

(56) References Cited

U.S. PATENT DOCUMENTS

| | | | |
|---|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |

(Continued)

FOREIGN PATENT DOCUMENTS

DE    767704    5/1953

(Continued)

*Primary Examiner*—Michael Cuff
*Assistant Examiner*—Andrew Nguyen
(74) *Attorney, Agent, or Firm*—Carlson, Gaskey & Olds PC (57) ABSTRACT

A transition duct (112) is provided at the outlet of a turbine engine. The transition duct transitions the outlet of the tip turbine engine (10) from round to rectangular. The transition duct also provides a plurality of variable vanes at the outlet of the transition duct. The transition duct incorporates a perimeter slot (124) providing cooling to the duct outer wall and attached components. The variable vanes (120) are installed to vector the exhaust gases. This allows the aircraft to decelerate, hover or accelerate in the forward direction by commanding the position of the variable vanes. One potential application of the tip turbine engine is for vertical installations in aircraft.

15 Claims, 5 Drawing Sheets

U.S. PATENT DOCUMENTS

| | | |
|---|---|---|
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,485,958 A * | 1/1996 | Nightingale ............ 239/265.19 |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |

| | | | | | |
|---|---|---|---|---|---|
| GB | 2026102 | 1/1980 | WO | 2006/059991 | 6/2006 |
| GB | 2095755 | 10/1982 | WO | 2006/059992 | 6/2006 |
| GB | 2191606 | 12/1987 | WO | 2006/059993 | 6/2006 |
| GB | 2229230 | 9/1990 | WO | 2006/059994 | 6/2006 |
| GB | 2265221 | 9/1993 | WO | 2006/059995 | 6/2006 |
| GB | 2401655 | 11/2004 | WO | 2006/059996 | 6/2006 |
| GB | 2410530 | 8/2005 | WO | 2006/059999 | 6/2006 |
| JP | 10184305 | 7/1998 | WO | 2006/060000 | 6/2006 |
| WO | 9902864 | 1/1999 | WO | 2006/060001 | 6/2006 |
| WO | 0127534 | 4/2001 | WO | 2006/060002 | 6/2006 |
| WO | 02081883 | 10/2002 | WO | 2006/060003 | 6/2006 |
| WO | 2004011788 | 2/2004 | WO | 2006/060004 | 6/2006 |
| WO | 2004022948 | 3/2004 | WO | 2006/060005 | 6/2006 |
| WO | 2004092567 | 10/2004 | WO | 2006/060006 | 6/2006 |
| WO | 2006/059968 | 6/2006 | WO | 2006/060009 | 6/2006 |
| WO | 2006/059969 | 6/2006 | WO | 2006/060010 | 6/2006 |
| WO | 2006/059972 | 6/2006 | WO | 2006/060011 | 6/2006 |
| WO | 2006/059973 | 6/2006 | WO | 2006/060012 | 6/2006 |
| WO | 2006/059974 | 6/2006 | WO | 2006/060013 | 6/2006 |
| WO | 2006/059975 | 6/2006 | WO | 2006/060014 | 6/2006 |
| WO | 2006/059976 | 6/2006 | WO | 2006/062497 | 6/2006 |
| WO | 2006/059977 | 6/2006 | WO | 2006059980 | 6/2006 |
| WO | 2006/059978 | 6/2006 | WO | 2006059990 | 6/2006 |
| WO | 2006/059979 | 6/2006 | WO | 2006060003 | 6/2006 |
| WO | 2006/059980 | 6/2006 | WO | 2006/059971 | 8/2006 |
| WO | 2006/059981 | 6/2006 | WO | 2006/059970 | 10/2006 |
| WO | 2006/059982 | 6/2006 | WO | 2006/110122 | 10/2006 |
| WO | 2006/059985 | 6/2006 | WO | 2006/110125 | 10/2006 |
| WO | 2006/059986 | 6/2006 | WO | 2006/059997 | 11/2006 |
| WO | 2006/059987 | 6/2006 | WO | 2006/110124 | 11/2006 |
| WO | 2006/059988 | 6/2006 | WO | 2006/110123 | 12/2006 |
| WO | 2006/059989 | 6/2006 | WO | 2006/112807 | 12/2006 |
| WO | 2006/059990 | 6/2006 | | | |

\* cited by examiner

VECTORING TRANSITION DUCT FOR TURBINE ENGINE

This invention was conceived in performance of U.S. Air Force contract F33657-03-C-2044. The government may have rights in this invention.

BACKGROUND OF THE INVENTION

The present invention relates to turbine engines, and more particularly to a vectoring transition duct particularly useful for, but not limited to, vertical lift installations of a turbine engine, such as a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft. As a result of this architecture, conventional turbofans have an exhaust temperature profile which tends to be hotter towards the engine centerline (turbine discharge) with the cooler fan bypass air outboard.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines may include a low pressure axial compressor directing core airflow into hollow fan blades. The hollow fan blades operate as a centrifugal compressor when rotating. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine architecture generates a radial temperature profile with cooler, fan bypass discharge air towards the centerline, and hotter turbine discharge outboard (opposite of conventional turbofans). The tip turbine engine provides a thrust-to-weight ratio equivalent to or greater than conventional turbofan engines of the same class, but within a package of significantly shorter length.

SUMMARY OF THE INVENTION

One potential application of the tip turbine engine is for vertical installations. Because the tip turbine engine is significantly shorter than conventional turbine engines, the tip turbine engine can more easily be installed vertically in aircraft to provide vertical lift. In the tip turbine engine of the present invention, a transition duct is provided for use especially (but not exclusively) in vertical installations. The transition duct transitions the outlet of the tip turbine engine from round to rectangular. The transition duct also provides a plurality of variable vanes at the outlet of the transition duct. The variable vanes are installed to vector the exhaust gases. This allows the aircraft to decelerate, hover or accelerate in the forward direction by commanding the position of the variable vanes.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
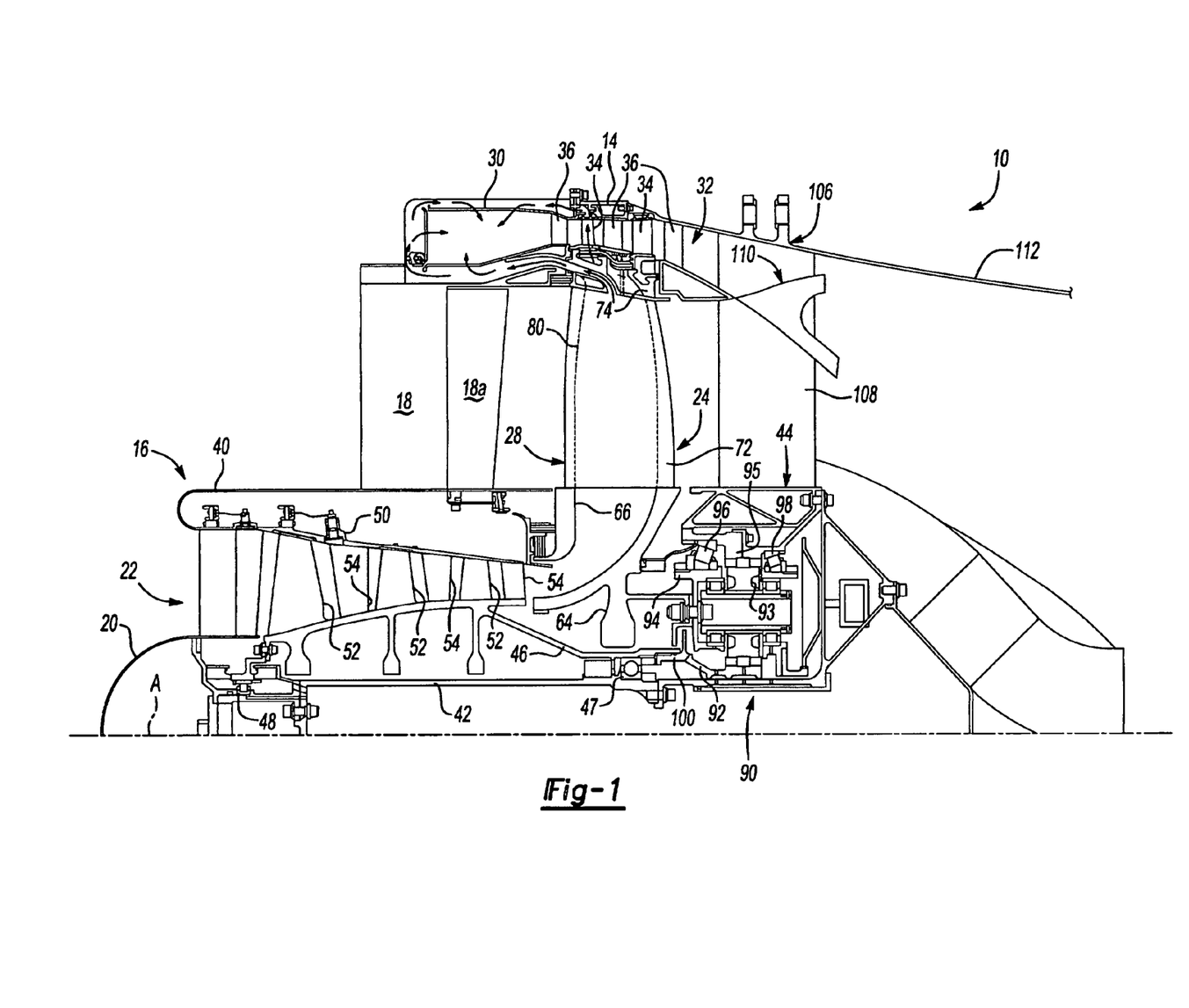
FIG. 1 is a longitudinal sectional view of the tip turbine engine along an engine centerline.

FIG. 1 illustrates a partial sectional view of a tip turbine engine (TTE) type gas turbine engine 10. The engine 10 includes a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A. A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

The rotationally fixed static inner support structure 16 includes a splitter 40, a static inner support housing 42 and a static outer support housing 44 located coaxial to said engine centerline A. The axial compressor 22 includes the axial compressor rotor 46, which is mounted for rotation upon the static inner support housing 42 through an aft bearing assembly 47 and a forward bearing assembly 48. A plurality of compressor blades 52 extend radially outwardly from the axial compressor rotor 46. A fixed compressor case 50 is fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example).

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again by the diffuser section 74 toward an axial airflow direction toward the annular combustor 30. Preferably, the airflow is diffused axially forward in the engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 may be an epicyclic gearbox, such as a planetary gearbox as shown, that is mounted for rotation between the static inner support housing 42 and the static outer support housing 44. The gearbox assembly 90 includes a sun gear 92, which rotates the axial compressor rotor 46, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed.

A plurality of exit guide vanes 108 are located between the static outer support housing 44 and the rotationally fixed exhaust case 106 to guide the combined airflow out of the engine 10. An exhaust mixer 110 mixes the airflow from the turbine blades 34 with the bypass airflow through the fan blades 28.

Figure 2:
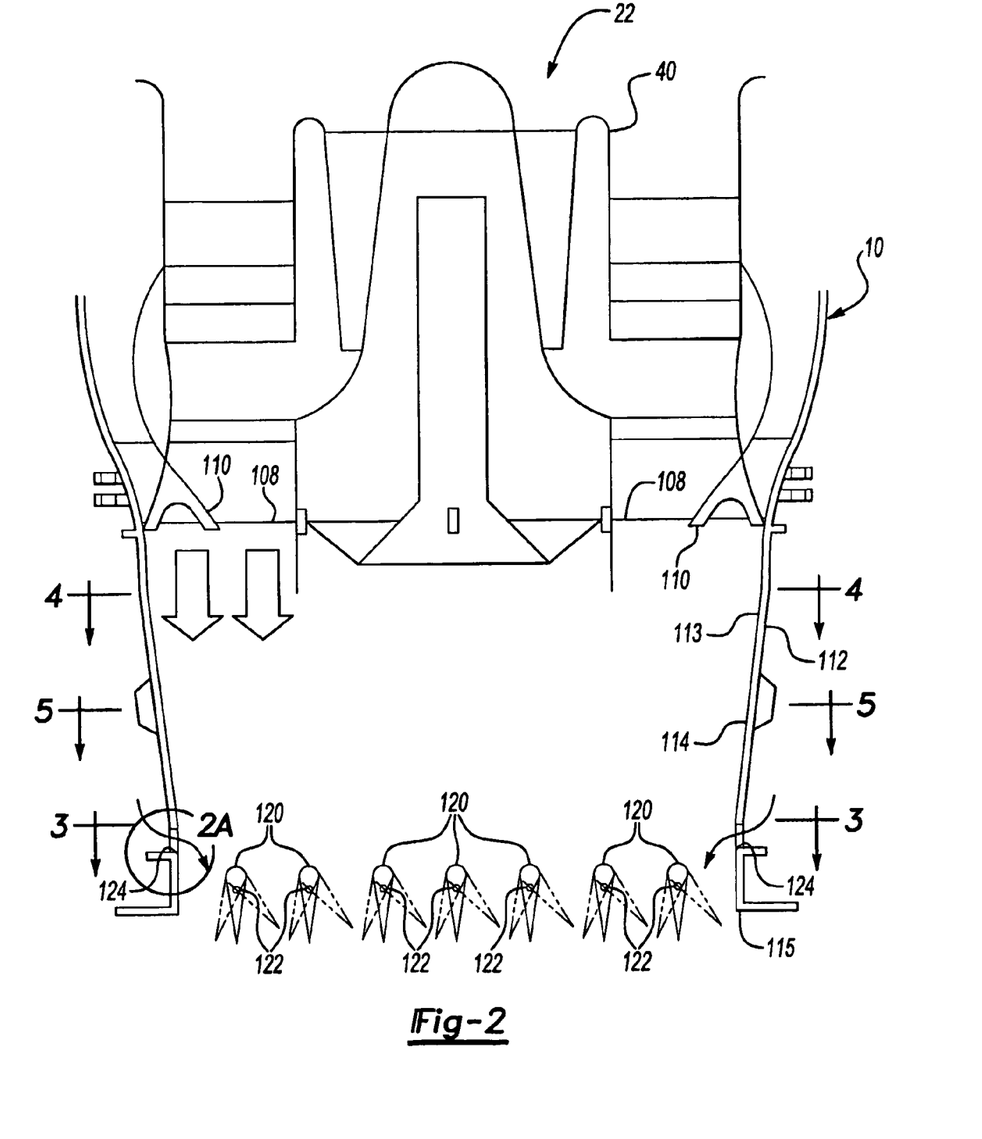
FIG. 2 illustrates the tip turbine engine of FIG. 1 installed vertically with a transition duct mounted below the tip turbine engine.

As shown in FIG. 2, a transition duct 112 is mounted to the outer support structure 14 aft of the exit guide vanes 108. The transition duct 112 includes a wall 113 defining an interior passageway 114 that transitions the flow out of the tip turbine engine 10 from round near the exit guide vanes 108 to rectangular at the outlet 115 of the transition duct 112. The transition duct 112 also provides a plurality of variable vanes 120 at the outlet 115 of the transition duct 112. The variable vanes 120 are pivotable on shafts 122 to vector the exhaust gases. The shafts 122 are generally transverse, and in this embodiment, substantially perpendicular, to the airflow through the interior passageway 114 of the transition duct 112. A full perimeter vent slot 124 provides cooling of the variable vanes 120 using a portion of vent air that is passed along the outside of the transition duct 112 and the tip turbine engine 10. This air could be nacelle ventilation flow used to minimize the heating of surrounding aircraft structure. Due to the unique radial temperature profile of the tip turbine exhaust (higher temperatures radially outward of the cooler temperatures), the perimeter slot is beneficial in that it promotes the evacuation of the nacelle ventilation flow while simultaneously providing cooling to the duct 112 in areas where bearings and other support for articulated vanes 120 mounted to shaft 122 reside.

Figure 2A:
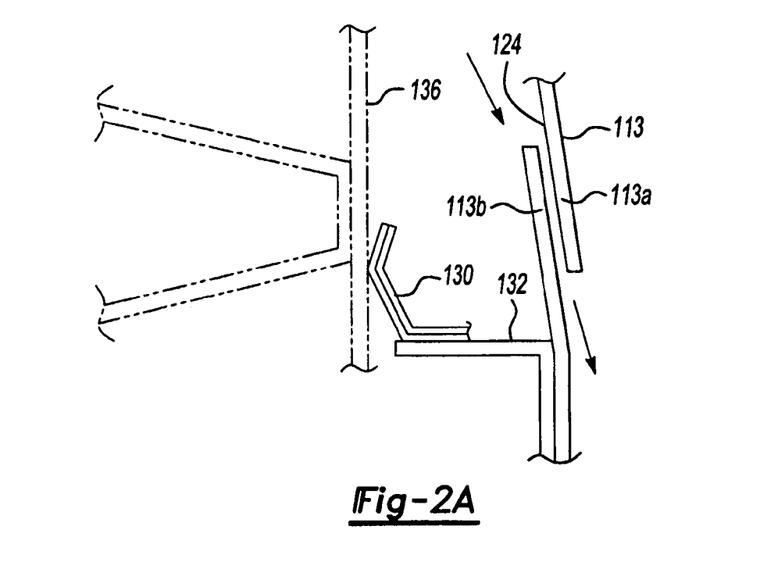
FIG. 2A is an enlarged view of the area 2A of FIG. 2.

FIG. 2A is an enlarged view of the area 2A of FIG. 2. As shown, the vent slot 124 extends through overlapping portions 113a, 113b of the transition duct outer wall 113. A peripheral seal 130 is formed between the attachment structure 132 for the variable vanes 120 (not shown in FIG. 2A) and the surrounding airframe structure 136.

Figure 3:
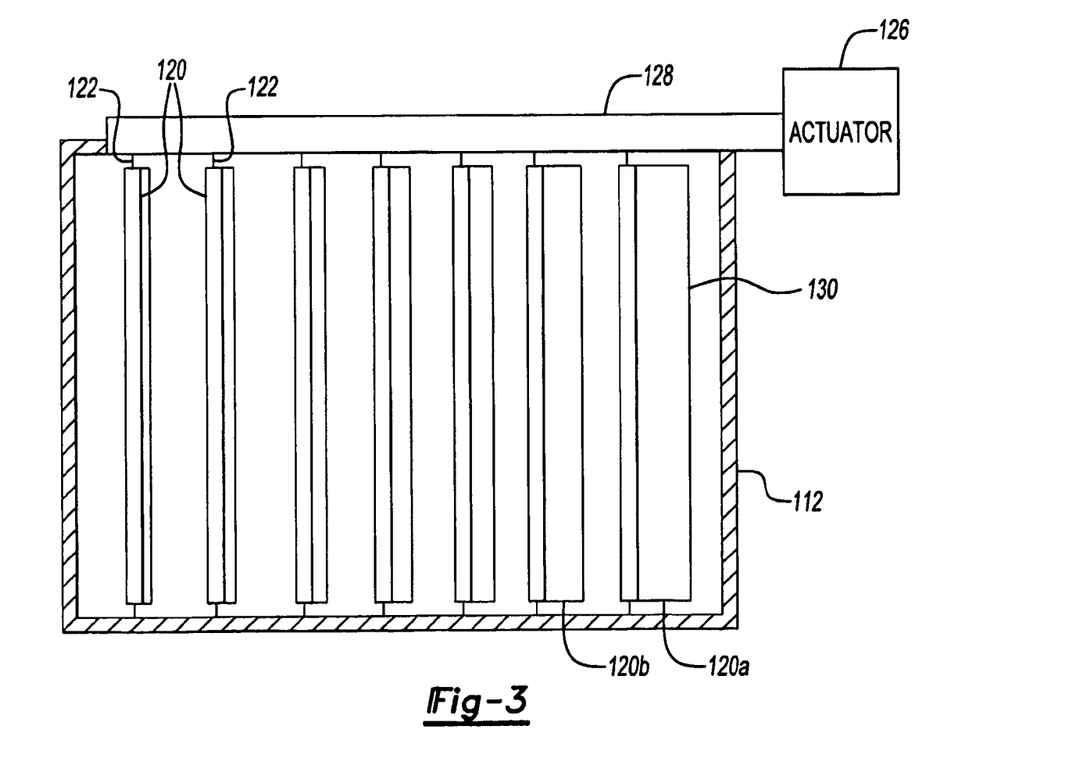
FIG. 3 is a sectional view taken along lines 3-3 of FIG. 2.

Referring to FIG. 3, an actuator 126, such as a linear hydraulic actuator, is connected via linkage 128 to all of the shafts 122 of the variable vanes 120. More than one actuator 126 could also be used. The linkage 128 include cams, levers, gears, and/or other mechanisms so that the variable vanes 120 are varied differently. The asymmetric vane kinematics are utilized for constant area and required thrust-post positioning. In particular, the variable vanes 120 near the side of the transition duct 112 opposite the direction of desired travel are angled away from their middle position more than the vanes 120 on the side of the transition duct 112 in the direction of desired travel. For example, the variable vane 120a is shown angled away from its middle position more than the next variable vane 120b, which in turn is angled more than the next variable vane 120c, and so on. This allows the aircraft to decelerate, hover or accelerate in the forward direction by commanding the position of the variable vanes 120.

Figure 4:
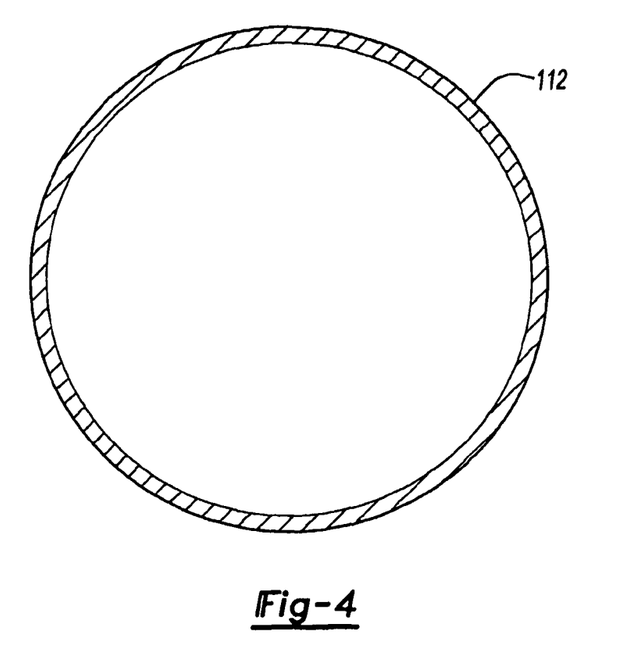
FIG. 4 is a sectional view taken along lines 4-4 of FIG. 2.
Figure 5:
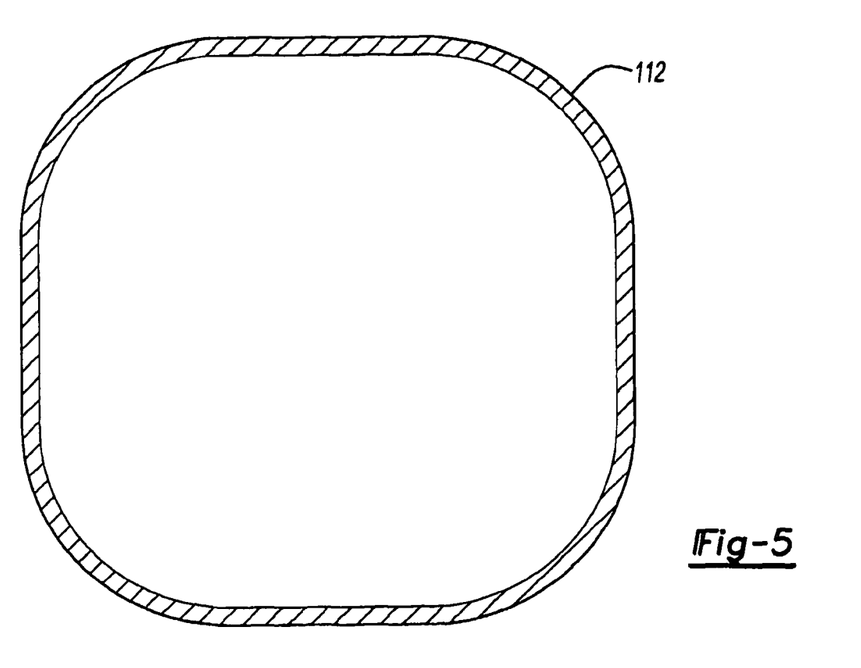
FIG. 5 is a sectional view taken along lines 5-5 of FIG. 2.

FIGS. 4 and 5 illustrate two progressive sections of the transition duct 112. As shown, the transition duct 112 transitions from a substantially round opening (FIG. 4) at the outlet of the tip turbine engine 10, to a rounded rectangular section (FIG. 5) to a substantially rectangular section (FIG. 3).

Figure 6:
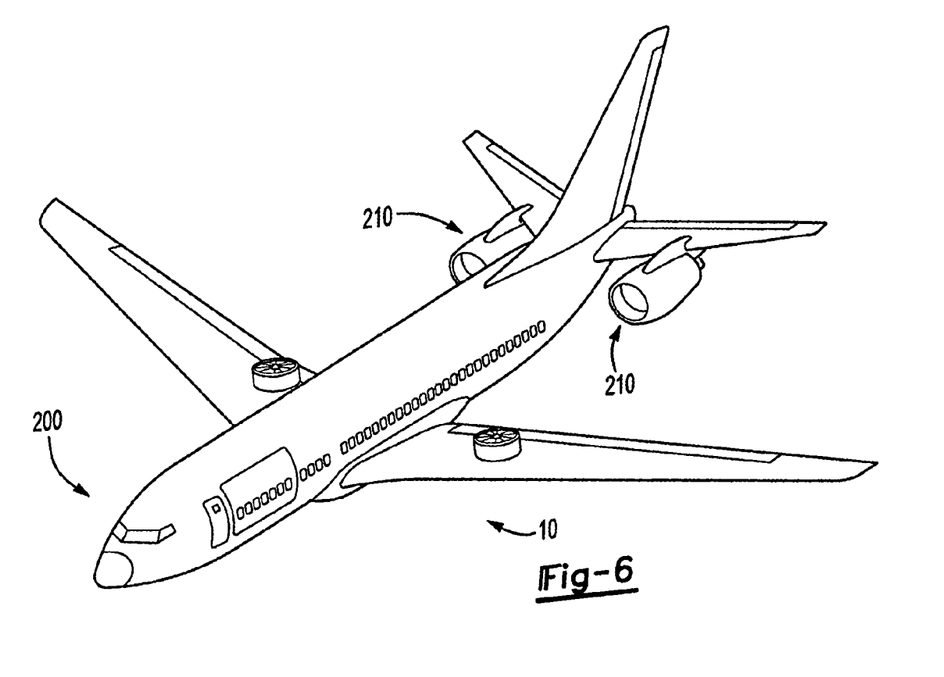
FIG. 6 illustrates the tip turbine engine installed in a vertical orientation in an aircraft.

FIG. 6 schematically illustrates the tip turbine engine 10 installed vertically in an aircraft 200. The aircraft 200 may optionally include at least one other turbine engine 210, mounted horizontally, which may be a tip turbine engine or a conventional turbine engine.

Referring to FIG. 2, in operation, core airflow enters the axial compressor 22, where it is compressed by the compressor blades 52. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 by the diffuser section 74 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in the exhaust case 106. Again, it should be noted that in the tip turbine engine 10, the higher temperature air is radially outward of the cooler bypass air. The transition duct 112 transitions the outlet of the tip turbine engine 10 from round to rectangular. The variable vanes 120 vector the exhaust gases to allow the aircraft to decelerate, hover or accelerate in the forward direction by commanding the position of the variable vanes 120.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, although the tip turbine engine 10 is shown in a purely vertical orientation, it could also be used horizontally. Also, the variable vanes 120 of the present invention would provide benefits to installations mounted only substantially vertically or even anywhere between purely horizontal and purely vertical. Whatever the installed orientation of the turbine engine 10, the transition duct 112 provides the ability to vector the air flow from the turbine engine 10 to maneuver the aircraft 200.

The invention claimed is:

1. A turbine engine assembly comprising:
   a fan including a plurality of fan blades, wherein at least one of the plurality of fan blades defines a centrifugal compressor chamber therein for compressing core airflow therein and guiding the compressed core airflow toward the combustor;
   a combustor burning fuel to generate a high-energy gas stream;
   a turbine downstream from the combustor, the turbine rotatably drivable by the high-energy gas stream;
   a transition duct downstream from the turbine and the fan, the transition duct having a first side and a second side opposite the first side; and
   a plurality of variable vanes spaced across the transition duct between the sides for vectoring airflow from the fan and the combustor, wherein each of the plurality of variable vanes is pivoted at an angle, and the angles progressively increase across the transition duct between the first side and the second side.

2. The assembly claim 1 wherein the fan draws bypass air through a bypass air flow path, the assembly further including an axial compressor radially inward of the bypass air flow path.

3. The assembly of claim 1 wherein an interior of the transition duct transitions from a generally round cross-section to a generally rectangular cross-section.

4. The assembly of claim 1 wherein the first side corresponds to a desired direction of travel, and the angles progressively increase from the first side to the second side.

5. The assembly of claim 1 further including an actuator for pivoting the variable vanes about axes generally perpendicular to the air flow through the transition duct.

6. An aircraft including the turbine assembly of claim 1, wherein the fan is rotatable about a generally vertical axis that is perpendicular to a longitudinal axis of an aircraft.

7. The assembly of claim 1 wherein the plurality of vanes are each pivotable about an axis generally transverse to air flow through the engine.

8. A turbine engine and controller comprising:
   a bypass fan including a plurality of fan blades, at least one of the fan blades defining a centrifugal compressor chamber therein for centrifugally compressing core airflow;
   a combustor burning fuel mixed with the compressed core airflow from the centrifugal compressor chamber to generate a high-energy gas stream;
   a turbine downstream from the combustor, the turbine rotatably driven by the high-energy gas stream, the turbine rotatably driving the bypass fan;
   a transition duct downstream from at least one of the turbine and the fan, the transition duct transitioning air flow through the transition duct from a generally round cross-section to a generally rectangular cross-section;
   a transition duct downstream from the turbine and the fan, the transition duct having a first side and a second side opposite the first side; and
   a plurality of variable vanes spaced across the transition duct between the sides for vectoring airflow from the fan and the combustor, wherein each of the plurality of variable vanes is pivoted at an angle, and the angles progressively increase across the transition duct between the first side and the second side.

9. The assembly claim 8 wherein the fan draws bypass air through a bypass air flow path, the assembly further including an axial compressor radially inward of the bypass air flow path, the axial compressor compressing core airflow prior to the centrifugal compressor chamber.

10. The assembly of claim 8 wherein first side corresponds to a desired direction of travel, and the angles progressively increase from the first side to the second side.

11. The assembly of claim 8 further including an actuator for pivoting the variable vanes about axes generally perpendicular to the air flow through the transition duct.

12. An aircraft including the turbine assembly of claim 8, wherein the fan is rotatable about a generally vertical axis that is perpendicular to a longitudinal axis of an aircraft.

13. The assembly of claim 1 wherein the plurality of vanes are each pivotable about an axis generally transverse to air flow through the engine.

14. A turbine engine comprising:
   a transition duct mounted proximate an outlet of the turbine engine having an outer wall defining an interior between an inlet and an outlet;
   a plurality of variable vanes pivotably mounted to the outer wall proximate the outlet for vectoring airflow through the interior;
   a vent through the outer wall between the inlet and the plurality of variable vanes, the vent extending entirely about an outer perimeter of the outer wall; and
   wherein the turbine engine includes a fan having a plurality of fan blades including at least one hollow fan blade having a core airflow compressor chamber defined therein.

15. The transition duct of claim 14 wherein the outer wall has a generally round cross-section proximate the inlet and a generally rectangular cross-section proximate the outlet.

* * * * *